US010126715B2

United States Patent
Tsuda et al.

(10) Patent No.: US 10,126,715 B2
(45) Date of Patent: Nov. 13, 2018

(54) CONTROLLER HAVING CPU ABNORMALITY DETECTION FUNCTION

(71) Applicant: FANUC Corporation, Minamitsuru-gun, Yamanashi (JP)

(72) Inventors: Taketsugu Tsuda, Minamitsuru-gun (JP); Tomoki Ohya, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 275 days.

(21) Appl. No.: 14/628,404

(22) Filed: Feb. 23, 2015

(65) Prior Publication Data

US 2015/0241854 A1    Aug. 27, 2015

(30) Foreign Application Priority Data

Feb. 24, 2014    (JP) ................. 2014-033347

(51) Int. Cl.
*G05B 9/02*        (2006.01)
*G05B 19/042*    (2006.01)
*G06F 11/00*      (2006.01)

(52) U.S. Cl.
CPC ........... *G05B 9/02* (2013.01); *G05B 19/0428* (2013.01); *G06F 11/004* (2013.01); *G05B 2219/24205* (2013.01)

(58) Field of Classification Search
CPC .................. G05B 9/02; G05B 19/0428; G05B 2219/24205; G06F 11/004
USPC ..................................... 700/299; 714/11, 24
See application file for complete search history.

(56) References Cited

U.S. PATENT DOCUMENTS

| | | | |
|---|---|---|---|
| 5,621,776 A | 4/1997 | Gaubatz | |
| 6,718,474 B1* | 4/2004 | Somers | G06F 1/08 713/322 |
| 6,839,013 B1 | 1/2005 | Cummins et al. | |
| 7,051,221 B2* | 5/2006 | Clabes | G06F 1/206 713/320 |
| 7,370,242 B2* | 5/2008 | Chen | G06F 1/20 700/300 |

(Continued)

FOREIGN PATENT DOCUMENTS

| CN | 101520683 A | 9/2009 |
|---|---|---|
| CN | 101770212 A | 7/2010 |

(Continued)

OTHER PUBLICATIONS

IBM, "Method to Provide Reading Synchronization Between Redundant Processors with Conflicting Measurements", Apr. 5, 2007. pp. 4.*

(Continued)

*Primary Examiner* — Miranda M Huang
*Assistant Examiner* — Olvin Lopez Alvarez
(74) *Attorney, Agent, or Firm* — Drinker Biddle & Reath LLP

(57) ABSTRACT

A controller is provided with a plurality of CPUs and temperature sensors disposed in the vicinity of the CPUs, individually. The CPUs reciprocally read temperature data detected by the temperature sensors. When the read temperature data exceed a predetermined threshold, it is determined that the CPUs are likely to undergo thermal runaway, and the CPUs are then stopped.

3 Claims, 2 Drawing Sheets

(56) References Cited

U.S. PATENT DOCUMENTS

| | | | |
|---|---|---|---|
| 7,852,138 B2* | 12/2010 | Kuusilinna | G01K 7/425 327/513 |
| 8,065,564 B2* | 11/2011 | Nakatani | G06F 11/1645 714/11 |
| 8,448,000 B2* | 5/2013 | Culbert | G06F 1/20 318/471 |
| 2003/0110012 A1* | 6/2003 | Orenstien | G06F 1/206 702/188 |
| 2003/0158697 A1 | 8/2003 | Gold et al. | |
| 2003/0229662 A1* | 12/2003 | Luick | G06F 1/206 718/106 |
| 2004/0037346 A1 | 2/2004 | Rusu et al. | |
| 2005/0271079 A1* | 12/2005 | Teoh | H04L 69/40 370/463 |
| 2006/0005097 A1* | 1/2006 | Ichikawa | G06F 9/5088 714/745 |
| 2006/0075207 A1 | 4/2006 | Togawa et al. | |
| 2006/0136074 A1* | 6/2006 | Arai | G05B 19/418 700/2 |
| 2007/0106428 A1* | 5/2007 | Omizo | G05D 23/19 700/300 |
| 2007/0136617 A1* | 6/2007 | Kanno | G06F 1/3203 713/320 |
| 2008/0091974 A1* | 4/2008 | Nakashima | G06F 1/3203 714/10 |
| 2009/0177445 A1* | 7/2009 | Capps, Jr. | G06F 1/206 703/1 |
| 2009/0290625 A1* | 11/2009 | Riddle | G06F 1/206 375/222 |
| 2010/0268475 A1 | 10/2010 | Kusumoto | |
| 2011/0022871 A1* | 1/2011 | Bouvier | G06F 1/3206 713/340 |
| 2012/0106428 A1* | 5/2012 | Schlicht | H04L 1/0015 370/312 |
| 2014/0006818 A1* | 1/2014 | Doshi | G06F 1/3203 713/320 |
| 2014/0025208 A1* | 1/2014 | Allen-Ware | G06F 11/2023 700/276 |
| 2014/0059325 A1 | 2/2014 | Morimoto et al. | |
| 2014/0203093 A1* | 7/2014 | Young | F24D 19/1066 237/8 A |
| 2015/0106642 A1* | 4/2015 | Naffziger | G06F 1/26 713/340 |
| 2016/0064063 A1* | 3/2016 | Nomura | G11C 11/40626 365/51 |

FOREIGN PATENT DOCUMENTS

| | | | |
|---|---|---|---|
| CN | 102569931 A | | 7/2012 |
| JP | H02-254330 A | | 10/1990 |
| JP | H06-038357 | | 2/1994 |
| JP | H09-287824 | | 11/1997 |
| JP | 2006-038357 A | | 2/2006 |
| JP | 2006-127462 | | 5/2006 |
| JP | 2009-287824 A | | 12/2009 |
| WO | WO-2004/019195 A2 | | 3/2004 |
| WO | WO-2009-119116 | | 10/2009 |
| WO | WO2014054349 | * | 4/2010 ............... G06F 1/28 |
| WO | WO-2013-080426 | | 6/2013 |

OTHER PUBLICATIONS

The Notification of First Office Action dated Nov. 29, 2016 in Chinese Patent Application No. 2015100866456 (7 pages) with an English Translation (8 pages).

Office Action dated Apr. 28, 2015 in counterpart Japan Patent Application No. 2014-033347 (3 pages) with English Translation (3 pages).

Office Action dated Jun. 19, 2017 in German Patent Application No. 10 2015 002 039.0 (6 pages) with an English translation (6 pages).

* cited by examiner

--PRIOR ART--

--PRIOR ART--

CONTROLLER HAVING CPU ABNORMALITY DETECTION FUNCTION

RELATED APPLICATION DATA

This application claims priority under 35 U.S.C. § 119 and/or § 365 to Japanese Application No. 2014-033347 filed Feb. 24, 2014, the entire contents is incorporated herein by reference.

BACKGROUND OF THE INVENTION

Field of the Invention

The present invention relates to a controller for a machine tool or the like, the controller having an abnormality detection function for CPUs used therein.

Description of the Related Art

A central processing unit (CPU) may possibly undergo thermal runaway, which may cause a fire in the worst case, if its junction temperature is exceeded. Therefore, it is necessary to mount a temperature sensor in the vicinity of the CPU or monitor the current consumption of a CPU power supply so that the CPU can be stopped in case of thermal runaway.

FIG. 3 is a diagram illustrating a conventional technique for detecting thermal runaway of a CPU in a controller in advance.

A controller 1 comprises a central processing unit (CPU) 2. A current monitoring circuit 3 is mounted in the vicinity of a power supply circuit of the CPU 2 for detecting thermal runaway of a CPU in advance. This technique requires the use of a high-precision current detection IC and its peripheral circuits, as well as a space for mounting the current monitoring circuit.

FIG. 4 is a diagram illustrating a conventional CPU abnormality detection technique disclosed in Japanese Patent Application Laid-Open No. 2-254330.

According to this technique, a plurality of ICs (ICs 5 and 6) in an electronic device 4 are provided with a plurality of temperature sensors, individually. Specifically, the IC 5 is provided with temperature sensors 7 and 8, and the IC 6 is provided with temperature sensors 9 and 10. A protection device 20 for protecting the ICs of the electronic device 4 comprises a CPU 21, memory (RAM/ROM) 22, A/D converter 23 for A/D conversion of signals, and multiplexer 24 for input signal switching.

IC temperature data detected by the temperature sensors 7 to 10 are processed by the protection device 20. If temperature differences (between the temperature sensors 7 and 8 and between the temperature sensors 9 and 10) exceed a predetermined value, the temperature sensors are determined to be out of order. If the temperatures of all the temperature sensors exceed a predetermined value when the temperature differences are not higher than the predetermined value, the temperatures are determined to be abnormal. According to this technique, an element to be temperature-controlled requires the use of the temperature sensors and the protection device for monitoring them.

In a method for monitoring heat/current consumption, a threshold should be set at a rather high value in consideration of an instantaneous current. In some cases, therefore, a system may be stopped after the CPU undergoes thermal runaway so that the CPU and its peripheral devices may be damaged. If the temperature sensors are used for monitoring purpose, moreover, normal operation cannot be performed in case of their thermal runaway, so that the system cannot be stopped.

SUMMARY OF THE INVENTION

Accordingly, the object of the present invention is to provide, as a method for solving these problems, a controller having a CPU abnormality detection function, capable of stopping a system comprising two or more CPUs by detecting any of the CPUs approaching its junction temperature without causing thermal runaway in such a manner that temperature sensors are mounted in the vicinity of the CPUs, individually, and temperatures are reciprocally monitored by the CPUs.

A controller having a CPU abnormality detection function comprises a plurality of CPUs and temperature sensors disposed in the vicinity of the CPUs, individually. The CPUs are configured to reciprocally read temperature data detected by the temperature sensors. Further, the controller comprises a CPU stop section configured to determine that the CPUs are likely to undergo thermal runaway and then stop the CPUs when the temperature data read by the CPUs exceed a predetermined threshold.

The CPUs may be connected to one another by an internal bus and read the temperature data from the temperature sensors through the internal bus.

Each of the CPUs may be configured to read the temperature data from the temperature sensors disposed in the vicinity thereof and of all the other CPUs, and the stop section may be configured to determine that one or some of the CPUs or peripheral circuits are abnormal and stop a system if any one of the absolute values of temperatures included in the data read by the CPUs exceeds a predetermined threshold.

Each of the CPUs may be configured to read the temperature data from the temperature sensors disposed in the vicinity thereof and of all the other CPUs, and the stop section may be configured to compare the data read by the CPUs and determine that one or some of the CPUs or peripheral circuits are abnormal and stop a system if there is a large variation between read temperatures.

According to the present invention, there can be provided a controller having a CPU abnormality detection function, capable of stopping a system comprising two or more CPUs by detecting any of the CPUs approaching its junction temperature without causing thermal runaway in such a manner that temperature sensors are mounted in the vicinity of the CPUs, individually, and temperatures are reciprocally monitored by the CPUs.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
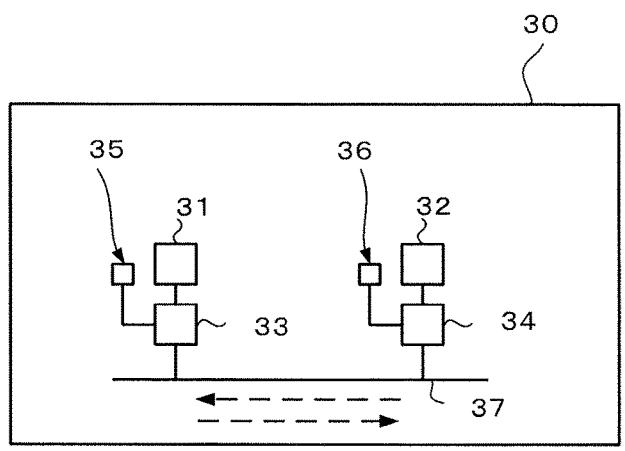
FIG. 1 is a diagram illustrating a first embodiment of a controller having a CPU abnormality detection function according to the present invention.

A first embodiment of a controller having a CPU abnormality detection function will first be described with reference to FIG. 1.

The controller for controlling a machine tool comprises a printed board 30. The printed board 30 comprises a first CPU 31, first LSI 33, first temperature sensor 35, second CPU 32, second LSI 34, and second temperature sensor 36. Thus, the printed board 30 of FIG. 1 comprises the two CPUs. The first and second LSIs 33 and 34 are connected to each other by an internal bus 37. An LSI is an element for conversion (or bridging) between a CPU and an internal bus and for controlling peripheral devices, such as a memory, temporary sensor, etc. On the printed board 30, the first and second temperature sensors 35 and 36 are disposed in the vicinity of the first and second CPUs 31 and 32, respectively.

The first CPU 31 acquires temperature data (temperature of the first CPU 31) detected by the first temperature sensor 35 and also acquires, through the internal bus 37, temperature data (temperature of the second CPU 32) detected by the second temperature sensor 36. Likewise, the second CPU 32 acquires the temperature data (temperature of the second CPU 32) detected by the second temperature sensor 36 and also acquires the temperature data (temperature of the first CPU 31) detected by the first temperature sensor 35.

The first and second CPUs 31 and 32 compare their respective acquired temperature data with a predetermined threshold. If the comparison indicates that the temperature data acquired by the first and second CPUs 31 and 32 exceed the predetermined threshold, it is determined that the first or second CPU 31 or 32 is likely to undergo thermal runaway, and arithmetic processing in the CPU is stopped. The computation in the CPU can be stopped by a conventional method, such as interrupt control. If the computation in the CPU is stopped, then the control of the machine tool by the controller will be stopped.

Figure 2:
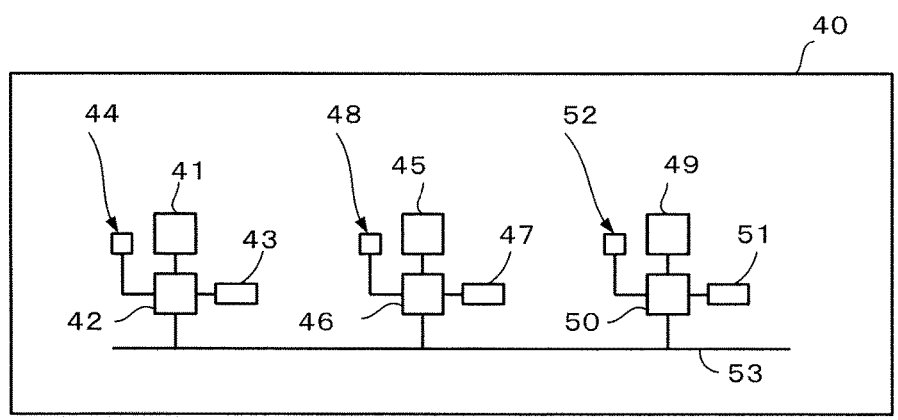
FIG. 2 is a diagram illustrating a second embodiment of the controller having a CPU abnormality detection function according to the present invention.
Figure 3:
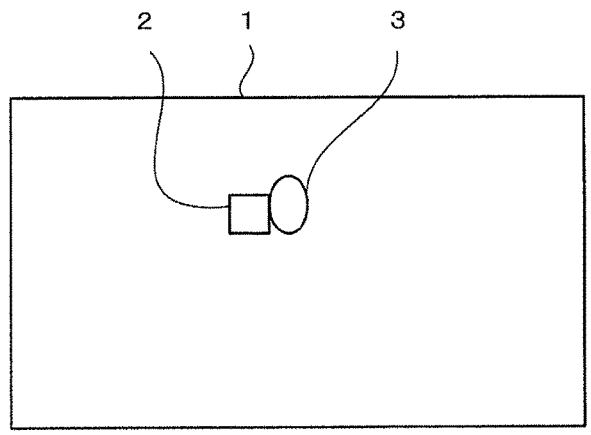
FIG. 3 is a diagram illustrating an example of prior art controller having a CPU abnormality detection function.
Figure 4:
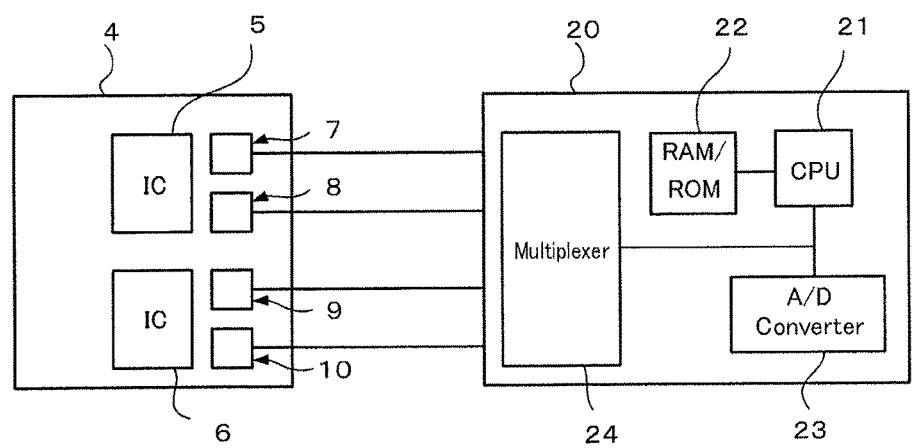
FIG. 4 is a diagram illustrating a conventional CPU abnormality detection technique disclosed in a prior art document (Japanese Patent Application Laid-Open No. 2-254330).

A second embodiment of the controller having a CPU abnormality detection function will now be described with reference to FIG. 2.

The controller for controlling a machine tool comprises a printed board 40. The printed board 40 comprises a first CPU 41, first LSI 42, first memory 43, first temperature sensor 44, second CPU 45, second LSI 46, second memory 47, second temperature sensor 48, third CPU 49, third LSI 50, third memory 51, and third temperature sensor 52. These elements are connected to one another by an internal bus 53. Thus, the printed board 40 of FIG. 2 comprises the three CPUs. The first, second, and third temperature sensors 44, 48 and 52 are disposed in the vicinity of the first, second, and third CPUs 41, 45 and 49, respectively.

The values of the first, second, and third temperature sensors 44, 48 and 52 read by the first CPU 41 are assumed to be T11, T12 and T13, respectively. These read values are stored in the first memory 43.

The values of the first, second, and third temperature sensors 44, 48 and 52 read by the second CPU 45 are assumed to be T21, T22 and T23, respectively. These read values are stored in the second memory 47.

The values of the first, second, and third temperature sensors 44, 48 and 52 read by the third CPU 49 are assumed to be T31, T32 and T33, respectively. These read values are stored in the third memory 51.

The first CPU 41 accesses the first, second, and third memories 43, 47 and 51 through the internal bus 53 and compares the values (T11, T21 and T31) of the first temperature sensor 44, the values (T12, T22 and T32) of the second temperature sensor 48, and the values (T13, T23 and T33) of the third temperature sensor 52. If the comparison indicates that any one of the values of the first, second, and third temperature sensors 44, 48 and 52 is not equal to the others, it is determined that the CPU or LSI (peripheral circuit) is abnormal. Thereupon, a system is stopped.

If the comparison of the values for the first CPU 41 indicates that the CPU and LSI are normal, the same comparison is also performed for each of the second and third CPUs 45 and 49.

The invention claimed is:

1. A controller comprising:
a plurality of central processing units (CPUs) comprising a first CPU, a second CPU, and a third CPU;
a first temperature sensor disposed in a vicinity of the first CPU;
a second temperature sensor disposed in a vicinity of the second CPU; and
a third temperature sensor disposed in a vicinity of the third CPU, wherein each of the first, second, and third CPUs includes a CPU stop section, the first CPU reciprocally reads first temperature data (T11) detected by the first temperature sensor, second temperature data (T12) detected by the second temperature sensor, and third temperature data (T13) detected by the third temperature sensor,
the second CPU reciprocally reads fourth temperature data (T21) detected by the first temperature sensor, fifth temperature data (T22) detected by the second temperature sensor, and sixth temperature data (T23) detected by the third temperature sensor,
the third CPU reciprocally reads seventh temperature data (T31) detected by the first temperature sensor, eighth temperature data (T32) detected by the second temperature sensor, and ninth temperature data (T33) detected by the third temperature sensor,
the first temperature data (T11), the fourth temperature data (T21), and the seventh temperature data (T31) are compared with each other, the second temperature data (T12), the fifth temperature data (T22), and the eighth temperature data (T32) are compared with each other, and the third temperature data (T13), the sixth temperature data (T23), and the ninth temperature data (T33) are compared with each other, and
wherein when a difference between read temperatures of any of the first CPU, the second CPU, or the third CPU is above a predetermined threshold, then a system is stopped and is determined that the plurality of CPUs or peripheral circuits are abnormal.

2. The controller according to claim 1, wherein the plurality of CPUs are connected to one another by an internal bus, and each CPU of the plurality of CPUs reads the temperature data from the temperature sensors in the vicinity of other CPUs of the plurality of CPUs through the internal bus.

3. The controller according to claim 1, wherein the read temperature data of each CPU of the plurality of CPUs is an absolute value of the detected temperature data.

* * * * *